Dec. 6, 1938.　　　　M. TIBBETTS　　　　2,139,391
MOTOR VEHICLE
Filed July 21, 1934　　　2 Sheets-Sheet 1
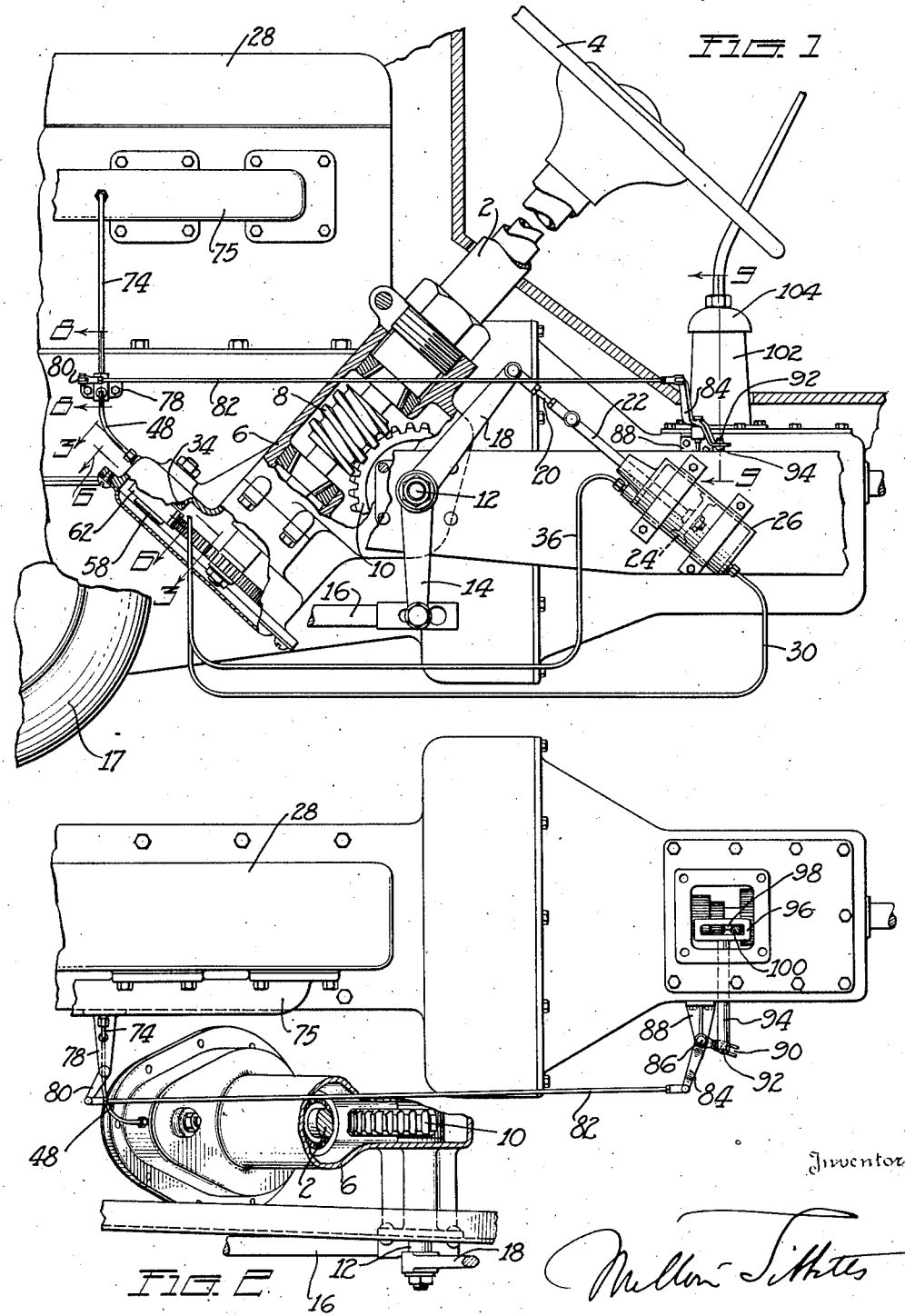

Dec. 6, 1938.   M. TIBBETTS   2,139,391
MOTOR VEHICLE
Filed July 21, 1934   2 Sheets-Sheet 2
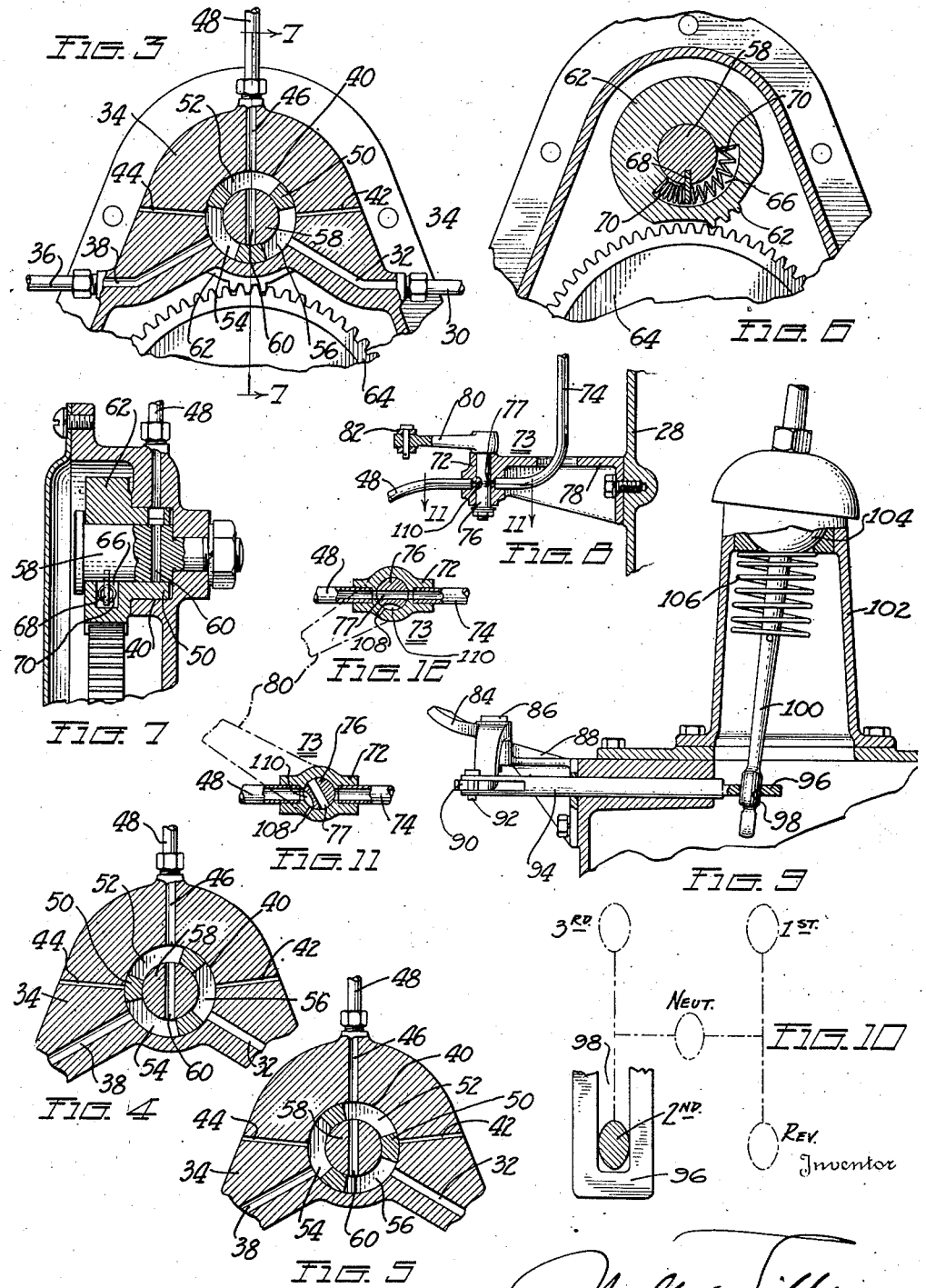

Patented Dec. 6, 1938

2,139,391

UNITED STATES PATENT OFFICE 2,139,391

MOTOR VEHICLE

Milton Tibbetts, Detroit, Mich., assignor to Packard Motor Car Company, Detroit, Mich., a corporation of Michigan Application July 21, 1934, Serial No. 736,338

4 Claims. (Cl. 180—79.2)

This invention relates to motor vehicles and more particularly to steering mechanisms for such vehicles.

In the operation of a motor vehicle a great deal of physical effort is often required to operate the steering gear. This is particularly true when the vehicle is stationary and when the vehicle is moving forwardly or rearwardly at relatively slow speeds. The general adoption of balloon tires by the manufacturers of motor vehicles has resulted in a substantial increase in the resistance of the wheels to steering movements. On account of this resistance, the operation of the steering gear of a motor vehicle in maneuvering the vehicle in close quarters and in driving in heavy traffic requires a great deal of strength and is very exhausting to the driver.

Because of the effort required to operate the steering gear under certain conditions, motor vehicles have been provided with power mechanism for exerting forces on the steering gear to assist the operator in moving said gear or to produce the actual steering movements of said gear.

When a motor vehicle is operating at moderate or at high speeds, the vehicle is steered with very little physical effort and it is undesirable that a power mechanism should then operate on the steering gear, inasmuch as this might interfere with the control of the vehicle by the driver. The greatest resistance to movements of the steering gear is encountered when a vehicle is stationary and when it is driven at relatively slow speeds and it is under these conditions that it is desirable that a power mechanism for operating on the steering gear should be thrown into operation.

One of the objects of the present invention is to improve generally the construction and mode of operation of power mechanisms for exerting forces on the steering gear of a motor vehicle to operate or tending to operate said gear to steer the vehicle.

Another object of the invention is to produce a power mechanism of the character referred to in which said mechanism is thrown into operation when the speed of the vehicle is such that a relatively heavy resistance to steering is encountered and is thrown out of operation when the speed of the vehicle is such that the vehicle may be easily steered manually.

Another object of the invention is to provide a power mechanism for operating upon the steering gear of a motor vehicle in which the power mechanism is thrown into and out of operation in accordance with certain changes in the adjustments of the change speed mechanism of the vehicle driving gear.

Another object of the invention is to produce a power mechanism of the said character in which said mechanism may be more easily controlled than could be done in prior mechanisms of this character.

In certain prior power mechanisms for operating upon the steering gear, the power is applied to said gear only after the driver has exerted a certain amount of force on the steering wheel tending to turn the vehicle wheels against the steering resistance. It is desirable that the power should be applied to the steering gear before this force is exerted by the driver since this relieves the driver of considerable effort and it is a further object of the invention to produce a power mechanism in which this result is accomplished.

With the above and other objects in view, the invention consists in a power mechanism embodying the novel and improved features hereinafter described and particularly pointed out in the claims, the advantages of which will be readily understood by those skilled in the art.

The various features of the invention will be clearly understood from the accompanying drawings illustrating the invention in its preferred form, and the following detailed description of the construction therein shown.

In the drawings,

Fig. 1 is a view partly in side elevation and partly in vertical section illustrating a steering mechanism for motor vehicles embodying the present invention;

Fig. 2 is a plan view with certain parts shown in section illustrating a portion of the mechanism shown in Fig. 1;

Fig. 3 is a detail sectional view taken substantially on the line 3—3 of Fig. 1;

Fig. 4 is a detail sectional view similar to Fig. 3 and illustrating one of the parts shown in Fig. 3 in a different position;

Fig. 5 is a view similar to Figs. 3 and 4 and illustrating one of the parts shown in said figures in a still different position;

Fig. 6 is a detail sectional view taken substantially on the line 6—6 of Fig. 1 but illustrating certain of the parts in different positions;

Fig. 7 is a detail sectional view taken substantially on the line 7—7 of Fig. 3;

Fig. 8 is a detail sectional view taken substantially on the line 8—8 of Fig. 1;

Fig. 9 is a detail view partly in elevation and partly in vertical section taken substantially on the line 9—9 of Fig. 1;

Fig. 10 is a diagrammatic view illustrating the control of the power mechanism from the gear shift mechanism;

Fig. 11 is a detail sectional view taken substantially on the line 11—11 of Fig. 8, and Fig. 12 is a view similar to Fig. 11 illustrating certain of the parts in different positions.

In the form of the invention illustrated in the drawings of this application, the invention is applied to a steering gear of a usual type provided for motor vehicles. This mechanism comprises a steering shaft indicated at 2 to the upper end of which is fixed a steering wheel 4. This shaft is rotatably mounted in bearings secured in a housing 6 and carries a worm gear 8 which meshes with a worm wheel segment 10 fixed to a rock shaft 12 also mounted in bearings in the housing 6. To the end of the shaft 12, projecting from the housing, is attached an arm 14, the lower end of which is connected with the rear end of the reach rod or drag link 16. The forward end of the reach rod is connected by the usual mechanism with the front wheels of the vehicle, one of which is indicated at 17 and the wheels are turned upon vertical axes in the usual manner to steer the vehicle by the longitudinal movements of the reach rod.

The power mechanism is arranged to apply power to the shaft 12 either to assist the driver in steering the vehicle or actually to impart steering movements to the steering mechanism. The power mechanism comprises an arm 18 secured to the shaft 12 and connected at its upper end by a link 20 with one end of a piston rod 22. Upon the piston rod 22 is mounted a piston 24 which operates in a vacuum cylinder 26.

The opposite ends of the vacuum cylinder 26 are arranged to be alternatively connected with the intake manifold of the internal combustion engine 28 by which the vehicle is driven to move the piston alternatively toward the opposite ends of the cylinder.

The steering mechanism of a motor vehicle is always adjusted so that the steering wheel and steering shaft have a certain amount of lost motion with relation to other parts of the steering mechanism. When the steering wheel and shaft are turned to the right or to the left to steer the vehicle the first part of the movement of the wheel and shaft carries these parts to the limit of their lost motion before the wheels of the vehicle are actuated and the said wheels are then turned to steer the vehicle in the required direction. The present power mechanism is arranged to be operated to cause the power to be applied to the steering gear to move or to tend to move the vehicle wheels in the proper direction by the lost motion movement of the steering wheel and shaft. This enables the said mechanism to be controlled with very little effort on the part of the operator.

The lower right hand end of the vacuum cylinder 26 is connected by a pipe 30 with a passage 32 in a valve casing 34 secured to and preferably formed integral with the steering gear housing 6. The upper left hand end of the vacuum cylinder is connected by a pipe 36 with a passage 38 in the valve casing 34. Both the passages 32 and 38 lead to a central valve chamber 40 which is connected with the atmosphere by means of restricted passages 42 and 44. The valve chamber is also connected by means of a passage 46 with a pipe 48 which in turn is arranged to be connected with the intake manifold.

Rotatably mounted in the chamber 40 is a valve member 50 consisting of a sleeve in which are formed slots 52, 54 and 56 constituting valve openings. Within the sleeve 50 is a fixed cylinder or shaft 58 in which is formed a diametrical passage 60. The said cylinder is secured to the valve casing substantially in the position shown in Fig. 3.

The valve member 50 is fixed to and preferably formed integral with a gear segment 62, the teeth of which mesh with the teeth of a gear 64 attached to the lower end of the steering shaft 2. The gear segment 62 is mounted for limited rotary movement about the shaft 58. To this end the gear segment is formed with a recess 66 into which projects a plate 68 secured in the shaft 58 and coiled springs 70 located upon opposite sides of the plate are interposed between the same and the respective ends of the recess.

When the gear 64 is turned in a clockwise direction, Figs. 3 and 6, the gear segment 62 is turned in the reverse direction substantially into the position shown in Fig. 6 and will remain in this position during the continued movement of the gear 64 and while said gear is stationary. In this operation, when the teeth of the gear 64 pass the teeth of the gear segment the said segment will be held by the left hand spring 70, Fig. 6, from further movement during the continued rotation of the gear 64, the teeth of the latter gear then merely clicking over one of the end teeth of the gear segment. In a similar manner, when the gear 64 is rotated in a counter-clockwise direction, the gear segment 62 will be turned in the reverse direction, and will be held in this position by the right-hand spring 70 during the continued rotation of the gear 64 and while said gear is stationary.

The above construction has the following mode of operation, assuming that the pipe 48 is connected to the intake manifold. When the steering wheel 4 and steering shaft 2 are positioned midway between the limits of the lost motion of these elements, the parts will occupy substantially the positions shown in Fig. 3 with the passage 38 in communication with the atmosphere through the slot 54 and the passage 44 and with the passage 32 also in communication with the atmosphere through the slot 56 and the passage 42.

With the valve member 50 in this position, the passage 60 is closed by said member and the passage 46 is cut off from communication with the passages 38 and 32 thereby cutting off the intake manifold from both ends of the vacuum cylinder. When the initial movement is imparted to the steering wheel and the steering shaft in a right hand direction to the limit of the lost motion of these parts preparatory to turning the vehicle wheels in the same direction, the gear 64 is rotated in a clockwise direction and the gear segment 62 is turned in the reverse direction substantially into the position shown in Fig. 6. This will place the rotatable valve member 50 substantially in the position shown in Fig. 4 to connect the passage 38 with the pipe 48 through the slot 54, the passage 60, the slot 52, and the passage 46. With the parts in these positions the upper left hand end of the vacuum cylinder is connected with the intake manifold and the suction exerted on the piston 24 will tend to move the piston toward said end of the cylinder. This force exerted on the piston, through the connections described, will tend to move the reach rod 16 in a direction to turn the vehicle wheels to the right. At this time the passage 32 is in communication with the atmosphere through the slot 56 and the passage 42 so that air is admitted into the lower right hand end of the vacuum cylinder. In a similar manner when the steering wheel and steering shaft are turned in a left hand direction to the limit of the lost motion of these parts preparatory to turning the vehicle wheels in the same direction, the valve member 50 is turned into the position shown in Fig. 5. With the valve member in this position the passage 32 is connected through the slot 56 and the passage 60, the slot 52 and the passage 46 with the pipe 48. The lower right hand end of the vacuum cylinder is thus connected with the intake manifold and the suction exerted upon the piston 24 will tend to move said piston toward the latter end of the cylinder. This force exerted on the piston will tend to move the reach rod 16 in a direction to turn the vehicle wheels to the left. At this time the passage 38 is in communication with the atmosphere through the slot 54 and passage 44 so that air may enter the upper left hand end of the vacuum cylinder.

The force exerted on the steering gear by the suction in the vacuum cylinder depends upon several factors such as the area of the piston 24 and the proportions of certain of the parts connecting the piston with the vehicle wheels. The parts may be so constructed that the force exerted by the power mechanism on the steering gear with any given degree of vacuum in the exhaust manifold will be sufficient to turn the vehicle wheels against any given steering resistance. Preferably, the construction of the parts is such that the force exerted by said mechanism will not be sufficient actually to operate the steering gear when the vehicle is standing but that the said force will assist the driver in operating said gear.

In the present construction, the connection between the pipe 48 and the vacuum cylinder is controlled by a valve which is operated in accordance with changes in the adjustment of the gear shift mechanism of the vehicle driving means. This valve is closed when the gear shift mechanism is adjusted in high or in second speed positions and is opened when said mechanism is adjusted in neutral, in low speed or in reverse positions.

The pipe 48 is connected at its upper end with a valve casing 72, of a valve indicated as a whole at 73. This casing is connected by means of a pipe 74 with the intake manifold 75 of the engine. Within the valve casing 72 is rotatably mounted a cylindrical valve member 76 having a diametrical passage 77 therein. The position of the valve member 76 is controlled from the gear shift mechanism of the vehicle. When the gear shift mechanism is adjusted in high speed or in second speed position, the valve member 76 is located in the valve casing in a position such as that shown in Fig. 11 to disconnect the vacuum cylinder from the intake manifold. When the gear shift mechanism is adjusted in neutral, in first speed or in reverse position, the valve member 76 is adjusted in the valve casing in a position such as that shown in Fig. 12 to connect the vacuum cylinder with the intake manifold.

The valve casing 72 is mounted on and preferably formed integral with a bracket 78 secured to the lower part of the engine. To the upper end of the valve member 76 is fixed an arm 80 which is connected by means of a rod or link 82 with one arm of a bell crank lever 84 pivoted at 86 on a bracket 88 attached to one side of the transmission gear casing. The other arm of said bell crank lever is formed with a slot 90 in which engages a pin 92 mounted in the outer end of a longitudinally movable slide bar 94 arranged to slide in guides in the transmission gear casing. Upon the inner end of the slide bar 94 is mounted a rectangular yoke 96 having therein a slot 98 in which engages the lower end of the gear shift lever 100. The gear shift lever is mounted for universal movement on a support 102 by means of the usual universal joint 104, acted upon by coiled spring 106.

Fig. 10 shows diagrammatically the manner in which the gear shift lever 100 controls the position of the yoke 96 and the slide bar 94 to control the position of the valve member 76 in the manner described. This figure shows the several positions of that part of the lever 100 which engages the yoke 96 when said lever is adjusted in the various speed positions and in neutral position. Thus when the lever is in high and second speed positions shown in this figure, the valve member 76 will be adjusted in the position shown in Fig. 11. When, however, the lever 100 is adjusted in neutral position or in first speed or reverse positions shown in this figure, the valve member 76 will be adjusted in the position shown in Fig. 12.

When the valve member 76 is adjusted to cut off communication between the intake manifold and the vacuum cylinder, both ends of the cylinder are in communication with the atmosphere through restricted passages so that the vacuum cylinder and piston 24 act as a dash pot to dampen any vibrations or "shimmy" in the steering gear. In order that the pipe 48 may be in communication with the atmosphere when the valve member 76 is in closed position, the valve casing 72 is provided with a restricted opening 108 and said valve member is cut away to form a groove 110. When the valve member 76 is in closed position as shown in Fig. 11, the pipe 48 is connected with the restricted opening 108 by means of the groove 110 in the valve member. When, however, the valve member 76 is in open position the pipe 48 is cut off from the opening 108 by the valve member as shown in Fig. 12.

With the valve member 76 in closed position and the valve member 50 in any one of the several positions shown in Figs. 3, 4 and 5, the ends of the vacuum cylinder will in each case be in communication with the atmosphere. When the valve member 50 is in the position shown in Fig. 3 the ends of the vacuum cylinder will be in communication with the atmosphere through the restricted passages 42 and 44. When the valve member is in the position shown in Fig. 4 the upper left hand end of the cylinder will be in communication with the atmosphere through the restricted opening 108 and the lower right hand end of said cylinder will be in communication with the atmosphere through the restricted passage 42. When the valve member 50 is in the position shown in Fig. 5 the lower right hand end of the vacuum cylinder will be in communication with the atmosphere through the restricted opening 108 and the upper left hand end of the cylinder will be in communication with the atmosphere through the restricted passage 44.

It is to be understood that the invention is not limited to the particular construction and arrangement of parts of the illustrated embodiment of the invention but that the construction shown and described is merely illustrative of the invention and that the invention may be embodied in other forms within the scope of the claims.

Having explained the nature and object of the invention and having specifically described a construction embodying the invention in its preferred form, what is claimed is:

1. In combination with a motor vehicle having a steerable road wheel controlled by a steering mechanism including a manual means for operating the mechanism, a power means operatively engaging said steering mechanism for boosting steering forces exerted on said wheel, valve means operatively engaging said manual means for controlling said power means, and means for restricting fluid flow in said power means when said valve means is in a neutral position whereby movements of said wheel under road conditions are cushioned when said steering forces are relaxed.

2. In combination with a motor vehicle having a steerable road wheel controlled by a steering mechanism including manual means for operating the mechanism, a power means operatively engaging said steering mechanism for boosting steering forces exerted on said wheel, valve means operatively engaging said manual means and movable to three positions by said manual means for controlling said power means, said valve determining the booster effort when in two of said positions, and fluid flow restricting means controlled by the third of said valve positions whereby said power means is converted into a shock absorber for cushioning the movements of said wheel under road shocks.

3. In a motor vehicle, the combination of steering mechanism for turning the vehicle road wheels, a steering wheel for actuating said mechanism, power mechanism for assisting the steering movements of said steering mechanism, valve means for controlling the power mechanism having a stationary part and a part rotatably mounted on the stationary part, a gear segment fixed to the rotatable part of said valve mechanism, a gear movable with said steering wheel and adapted to mesh with said gear segment, and yielding means connecting said rotatable valve part with the stationary valve part in a relation tending to hold said gear segment in mesh with said gear.

4. In a motor vehicle, the combination of steering mechanism for turning road wheels, a manually operable steering wheel for actuating said mechanism, a power mechanism for assisting steering movements of said steering mechanism, valve means for controlling the power mechanism having a stationary part and a part rotatably mounted on the stationary part, one of said parts having a slot and the other of said parts having an abutment projecting inwardly of said slot, springs in the slot on both sides of said abutment, a gear segment fixed to the rotatable part of said valve means, and a gear movable with said steering wheel adapted to mesh with said gear segment, said springs being arranged in a relation tending to hold said gear segment in mesh with said gear.

MILTON TIBBETTS.